US00RE44517E

(19) United States
(12) Reissued Patent
Albert et al.

(10) Patent Number: US RE44,517 E
(45) Date of Reissued Patent: Oct. 8, 2013

(54) LARGE-CAPACITY VEHICLE FOR TRANSPORTING PEOPLE, ESPECIALLY A RAIL VEHICLE, COMPRISING CARRIAGES THAT ARE CONNECTED IN AN ARTICULATED MANNER

(75) Inventors: Volker Albert, Krefeld (DE); Paul Bernard, Aachen (DE); Dirk Schillings, Crostau (DE)

(73) Assignee: Siemens Aktiengesellschaft, Munich (DE)

(21) Appl. No.: 13/067,731

(22) Filed: Jun. 22, 2011

Related U.S. Patent Documents

Reissue of:

(64) Patent No.: 7,549,378
Issued: Jun. 23, 2009
Appl. No.: 10/572,561
PCT Filed: Aug. 6, 2004
PCT No.: PCT/EP2004/008823
§ 371 (c)(1),
(2), (4) Date: Mar. 17, 2006
PCT Pub. No.: WO2005/037621
PCT Pub. Date: Apr. 28, 2005

(30) Foreign Application Priority Data

Sep. 19, 2003 (DE) ..... 103 43 536

(51) Int. Cl.
*B61D 17/00* (2006.01)

(52) U.S. Cl.
USPC ..... 105/3; 105/4.1; 105/8.1; 280/403

(58) Field of Classification Search
USPC ..... 105/3, 4.1, 8.1, 17, 18; 280/403, 485, 280/486
See application file for complete search history.

(56) References Cited

U.S. PATENT DOCUMENTS

| | | | |
|---|---|---|---|
| 3,562,320 | A | 2/1971 | Woodward et al. |
| 4,421,339 | A | 12/1983 | Hagin |
| 5,052,707 | A | 10/1991 | Timan |
| 5,197,392 | A | 3/1993 | Jeunehomme |
| 5,487,555 | A | 1/1996 | Koch et al. |
| 6,167,814 | B1 | 1/2001 | Sugimoto et al. |
| 6,250,231 | B1 | 6/2001 | Karasek |

FOREIGN PATENT DOCUMENTS

| | | |
|---|---|---|
| DE | 1 142 894 | 1/1963 |
| DE | 1 768 253 | 10/1971 |
| DE | 297 07 031 | 11/1997 |
| DE | 298 03 504 | 7/1999 |
| DE | 101 39 970 | 2/2003 |
| EP | 0 562 598 | 9/1993 |
| FR | 1 539 860 | 9/1968 |
| JP | 50-100704 A | 8/1975 |

OTHER PUBLICATIONS

Translation of Office Action for JP patent application No. 2006-526530 with Abstract Translation of JP 50-100704 A.

(Continued)

*Primary Examiner* — Lars A Olson

(74) *Attorney, Agent, or Firm* — Harness, Dickey & Pierce, P.L.C.

(57) ABSTRACT

A large-capacity vehicle is disclosed for transporting people, especially a rail vehicle. The vehicle includes carriages that are coupled by articulated connections, at least two of the carriages being respectively supported on a bogie or the undercarriage. All of the articulated connections enable the carriages to perform a turning movement about the vertical axis during cornering. For a vehicle that has more than three parts, at least one articulated connection is embodied in such a way that the vehicle can carry out pitching motions about the transversal axis in the event of dumping or tipping. One of the articulated connections includes a connection element that is embodied and connected to two carriages in such a way that pivoting and rolling motions can be carried out about the longitudinal axis of the vehicle.

17 Claims, 4 Drawing Sheets

(56) References Cited

OTHER PUBLICATIONS

German translation of Search Report for JP patent application No. 2006-526530 dated Sep. 3, 2008.
Office Action for German patent application No. 103 43 536.0 dated Nov. 28, 2005.
Office Action for German patent application No. 103 43 536.0 dated Apr. 21, 2006 with German translation aid.
"Innovatives Rohbaukonzept für ein modulares Straβenbahnfahrazeug," Sonderdruck aus Der Nahverkehr, Nr. 6/96, Seite 48-53, Autoren: Jürgen Schnaas, Urs Meier.
"LRV orders progress, but trams stall," Metro Report 2003, www.railwaygazette.com.
International Preliminary Report on Patentability and Written Opinion for international application No. PCT/EP2004/008823 (in German and with English translation, as well as a German translation aid).
German Office Action, Nov. 28, 2005.
German Office Action, Apr. 21, 2006.
Translation of Japanese Office Action with Abstract Translation of JP 50-100704 A.
German Translation of Japanese Search Report of Sep. 3, 2008.

LARGE-CAPACITY VEHICLE FOR TRANSPORTING PEOPLE, ESPECIALLY A RAIL VEHICLE, COMPRISING CARRIAGES THAT ARE CONNECTED IN AN ARTICULATED MANNER

Matter enclosed in heavy brackets [ ] appears in the original patent but forms no part of this reissue specification; matter printed in italics indicates the additions made by reissue.

This application is the national phase under 35 U.S.C. §371 of PCT International Application No. PCT/EP2004/008823 which has an International filing date of Aug. 6, 2004, which designated the United States of America and which claims priority on German Patent Application number 103 43 536.0 filed Sep. 19, 2003, the entire contents of which are hereby incorporated herein by reference.

FIELD

The invention generally relates to a large-capacity vehicle for transporting people, for example a rail vehicle. For example, it may relate to one which has carriages (such as car bodies, for example) which are coupled by articulated connections, at least two carriages of which are respectively supported on a bogie or set of running gear (undercarriage), wherein all the articulated connections permit turning movements of the carriages about the vertical axis when cornering. Further, in a vehicle which has more than three parts, at least one articulated connection is embodied in such a way that the vehicle can carry out pitching movements about the transversal axis when traveling through a depression or over an elevation.

BACKGROUND

In the periodical Der Nahverkehr [Local Transportation], No. 6/1996, pages 48 to 53, an innovative shell construction for a modular tram vehicle is described. In the four-part prototype vehicle which is shown in FIG. 2 of this reference a car body which is configured in the manner of a bridge (central module) is connected in an articulated fashion to two carriages which are each supported on a dual-axle set of running gear (dual-axle running gear modules). The prototype vehicle also has a car body which rests on a single-axle set of running gear (single-axle running gear module).

The lower articulated connections include vehicle joints which can move in a spherical fashion and are rigidly connected to the carriages by brackets. These lower joints, which are disclosed as an assembly in, for example, DE 101 39 970 A1, permit pivoting movements and in theory also pitching and rolling movements. The first embodiment of the above joints which is arranged between the central module and the two dual-axle running gear modules in the prototype vehicle only permit a pivoting movement about the vertical axis (z axis).

A second embodiment of the above joint which is arranged between the car body with the single-axle running gear module and the central module in the prototype also permits the vehicle to carry out a pitching movement about the transversal axis when traveling through a depression or over an elevation. With this second embodiment of the joints, the carriages are connected by way of a transversal connector which acts on a respective bracket of the two carriages.

In the modular vehicle explained above and also in other so-called multi-joint vehicles—see in this respect the periodical Railway Gazette 2003, pages 57 to 64, for example FIG. 4 "Dresden NGTD 6", FIG. 6 "Citadis" and FIG. 7 "Cityrunner"—joints are therefore used which permit either only pivoting of the carriages about the vertical axis or pivoting and pitching of the carriages about the vertical axis or about the transversal axis. In certain track situations (such as in particular elevations in the track in bends or twists in the track) torsion may occur in the carriages resulting in high stresses on the structure of the carriages. Even if the carriages are dimensioned to cope with these high stresses, overloading and damage to the car body structures when traveling cannot be ruled out.

At least one embodiment the invention is therefore based on an object of embodying a large-capacity vehicle with the generic features in the simplest possible way such that overloading and damage to the car body structures are reliably avoided in all track situations.

An object may be achieved according to at least one embodiment of the invention in such a way that one of the articulated connections has a connecting element which is embodied and connected to two carriages in such a way that pivoting and rolling movements about the longitudinal axis of the vehicle are made possible. The connecting element can be embodied as a rigid connector rod and can be connected to the two carriages via ball and socket joints. Alternatively, it is possible to connect the connecting element as a twistable connector rod and to connect it to the two carriages via single-axle joints.

Since, according to at least one embodiment of the invention, one of the articulated connections permits a pivoting and rolling movement of the carriages, the wagon bodies are advantageously not subjected to any torsional stress which could cause damage.

BRIEF DESCRIPTION OF THE DRAWINGS

The invention will be described in more detail below with reference to example embodiments which are each illustrated in their basic form in the drawings.

FIG. 1 shows the neutral position, FIG. 2 shows a pure rolling movement and FIG. 3 shows a pure pivoting movement.

DETAILED DESCRIPTION OF THE EXAMPLE EMBODIMENTS

Figure 1:
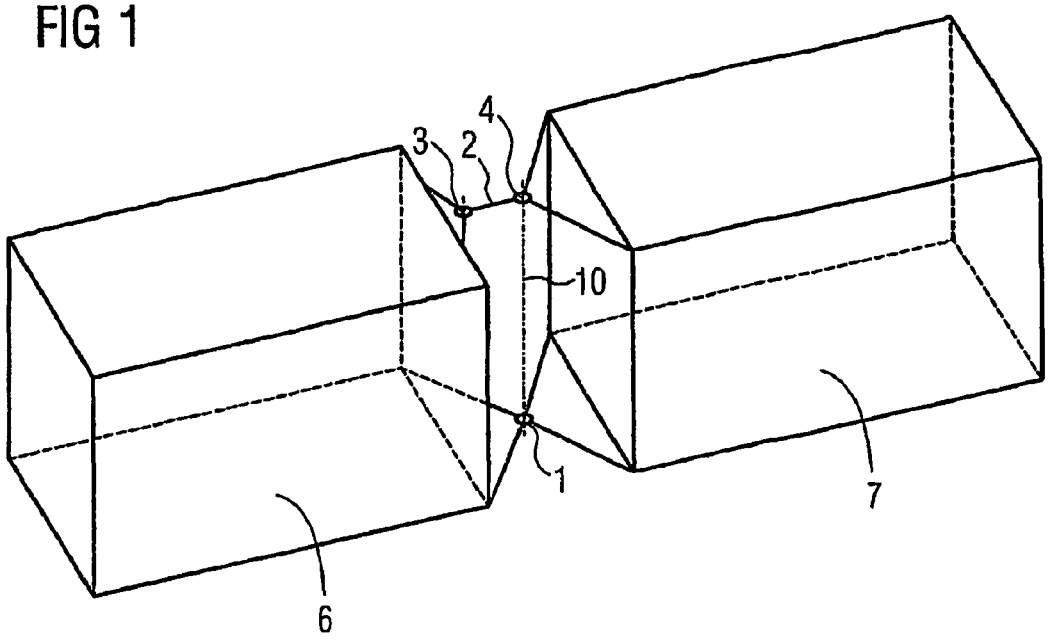
FIGS. 1 to 3 show two carriages of a rail vehicle with a first embodiment of the articulated connection according to the invention.
Figure 2:
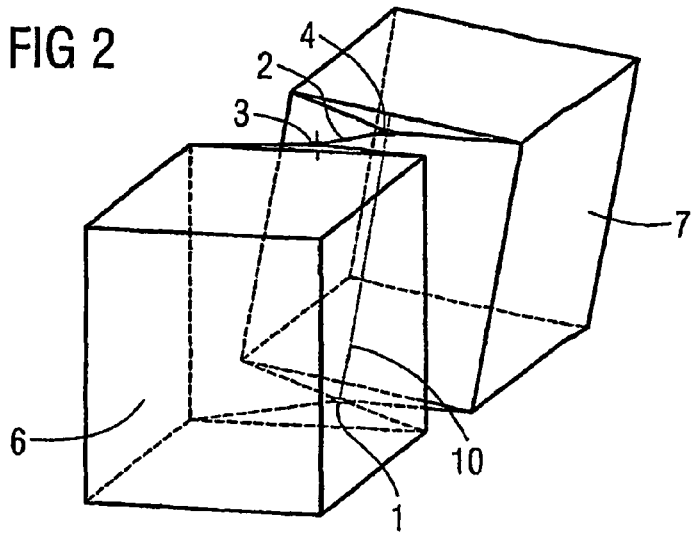
Figure 3:
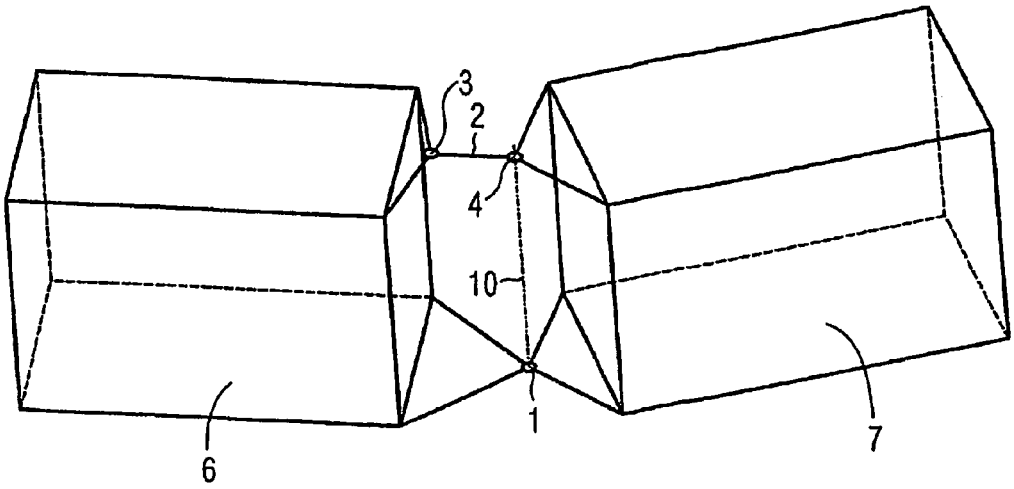

The carriages 6, 7 are preferably components of a rail vehicle which is of modular design and has, for example, a total of three, five or more carriages. The car body 6 can be supported on a bogie or set of running gear, while the car body 7 is embodied in the manner of a bridge and is borne by the supported car body 6 and a further supported car body (6) which is arranged to the right of the bridge-like car body 7 in the plane of the drawing in FIGS. 1 to 7. However it is also conceivable to support all the carriages on bogies or sets of running gear.

All the carriages of the multi-part rail vehicle are coupled by way of articulated connections which permit turning movements of the carriages about the vertical axis when the vehicle travels through a bend. In a rail vehicle which has more than three parts, at least one articulated connection is embodied in such a way that the vehicle can carry out pitching movements about the transversal axis when traveling through a depression or over an elevation. So that rolling movements of the carriages 6, 7 about the longitudinal axis of the vehicle are also permitted, the articulated connection shown has a connecting element 2 which, according to FIGS. 1 to 3 and 4 to 7, is embodied as a rigid connector rod and is connected to the two carriages 6, 7 by way of ball and socket joints 3, 4.

Figure 4:
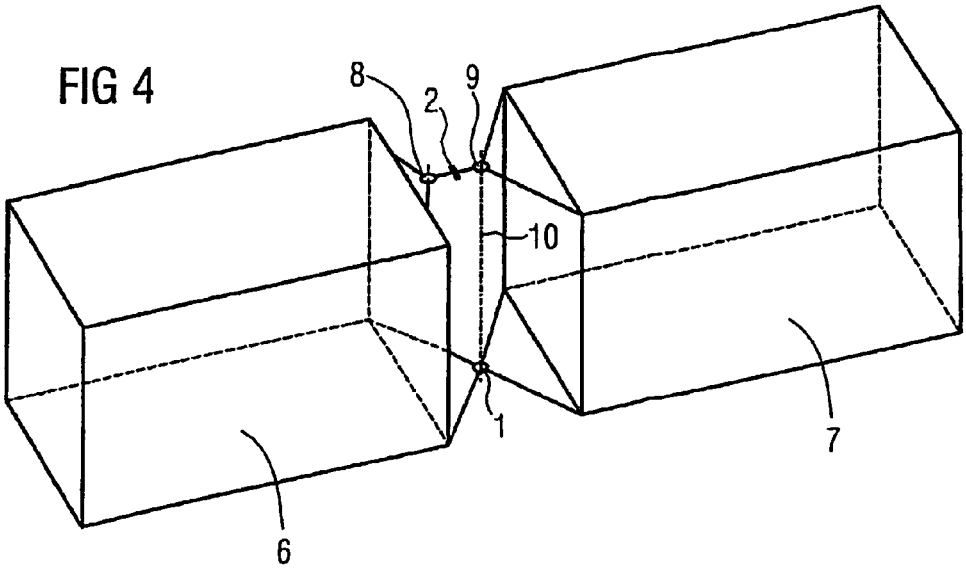
FIG. 4 shows two carriages of a rail vehicle with a second embodiment of the articulated connection according to the invention in a neutral position.
Figure 5:
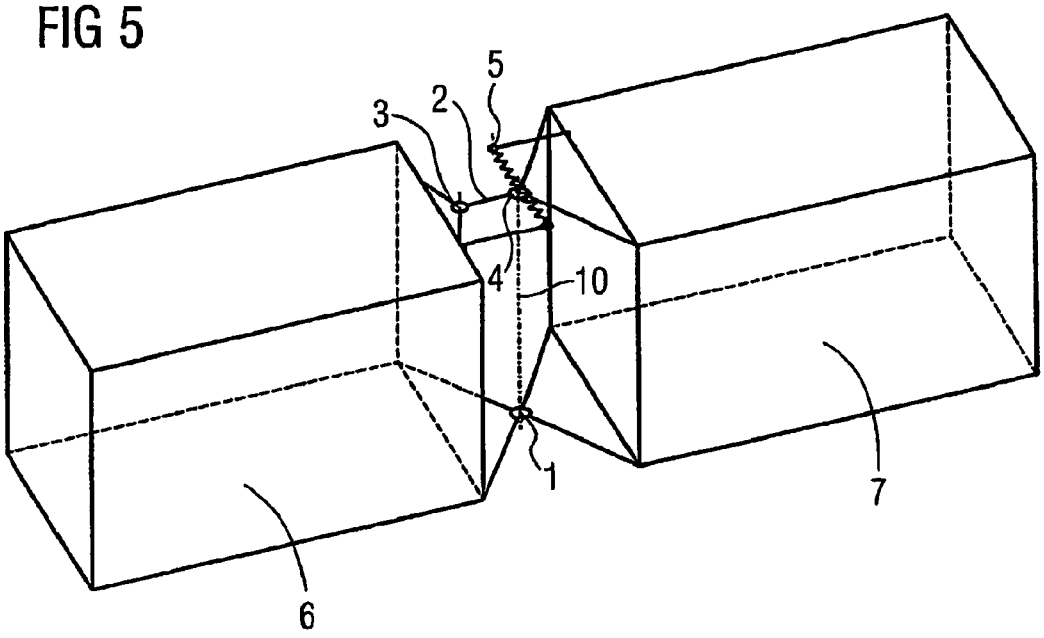
FIGS. 5, 6 and 7 each show different embodiments and arrangements of a component for limiting the rolling movements using the example of the first embodiment of the articulated connection according to FIG. 1.
Figure 6:
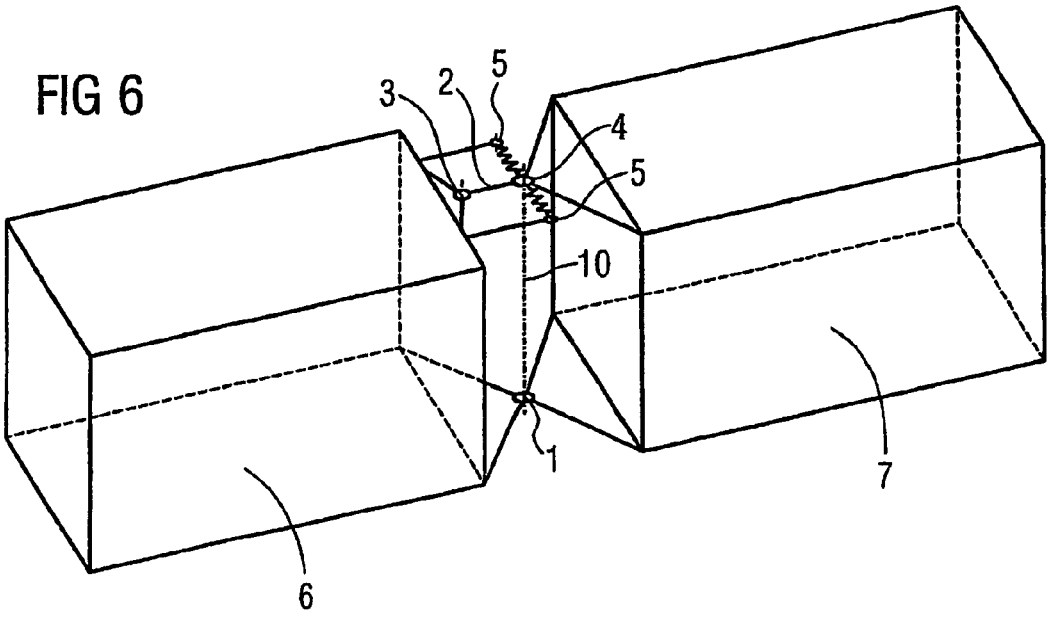
Figure 7:
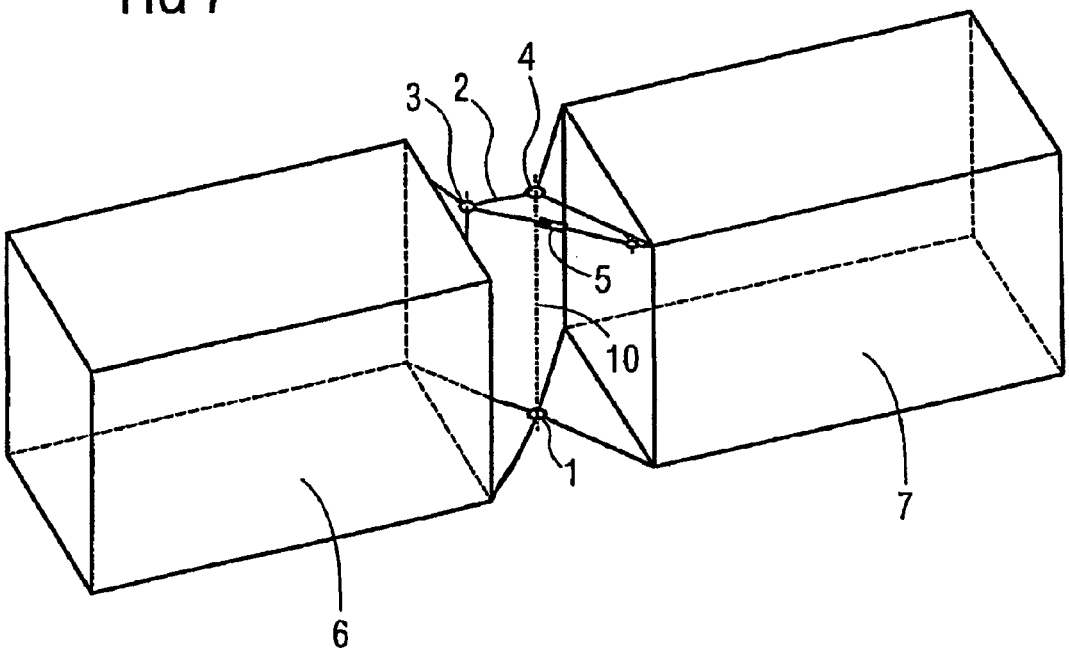

In the alternative embodiment which is shown in FIG. 4, the connecting element 2 is embodied as a twistable connector rod and is connected to the two carriages 6, 7 by use of single-axle joints 8, 9. In the lower region, the carriages 6, 7 are coupled by use of a vehicle joint 1 which can move in a spherical fashion. One of the rotational axes which is formed by the ball and socket joints 3, 4 or by the single-axle joints 8, 9 and the rotational axis of the vehicle joint 1 preferably lie on the same vertical axis 10. As a result of this, satisfactory pivoting about the vertical axis is possible.

The rolling movement is basically limited by the length of the connecting element 2. However, it is recommended to limit the rolling movements by a component 5 which has a damping function and includes the function of a stop. Furthermore, the component 5 can have a spring-loading function. According to FIG. 5, the component 5 acts on the two carriages 6, 7. According to FIGS. 6 and 7, the component 5 can also be arranged in such a way that it acts on one of the carriages 6, 7 at one end, and on one of the ball and socket joints 3, 4 at the other. The arrangements, shown in FIGS. 5 to 7, of the component 5 which limits the rolling movements can readily be transferred to the second embodiment of the articulated connection according to at least one embodiment of the invention which is illustrated in FIG. 4.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A large-capacity vehicle for transporting people, comprising:

carriages coupled by lower articulated connections and by upper articulated connections, at least two carriages being respectively supported on at least one of a bogie and set of running gear, both the lower articulated connections and the upper articulated connections permitting turning movements of the carriages about the vertical axis when cornering, the vehicle including more than three parts, wherein at least one upper articulated connection is embodied in such a way that the vehicle can carry out pitching movements about a transverse axis when traveling through a depression or over an elevation, one of the upper articulated connections including a connecting element embodied and connected to the at least two carriages configured to permit pivoting and rolling movements about a longitudinal axis of the vehicle, wherein the connecting element of the upper articulated connection is embodied as a rigid connector rod and is connected to the two carriages via ball and socket joints.

2. The large-capacity vehicle as claimed in claim 1, wherein the rolling movements are limited by a component including a damping function.

3. The large-capacity vehicle as claimed in claim 2, wherein the component includes the function of a stop.

4. The large-capacity vehicle as claimed in claim 3, wherein the component has a spring loading function.

5. The large-capacity vehicle as claimed in claim 3, wherein the component limits the rolling movements acting on the two carriages.

6. The large-capacity vehicle as claimed in claim 3, wherein the component limits the rolling movements acting on the carriages at one end, and limits the rolling movements acting on at least one of the ball and socket joints and a single-axis joint at the other end.

7. The large-capacity vehicle as claimed in claim 2, wherein the component has a spring loading function.

8. The large-capacity vehicle as claimed in claim 7, wherein the component limits the rolling movements acting on the two carriages.

9. The large-capacity vehicle as claimed in claim 7, wherein the component limits the rolling movements acting on the carriages at one end, and limits the rolling movements acting on at least one of the ball and socket joints and a single-axle joint at the other end.

10. The large-capacity vehicle as claimed in claim 2, wherein the component limits the rolling movements acting on the two carriages.

11. The large-capacity vehicle as claimed in claim 2, wherein the component limits the rolling movements acting on the carriages at one end, and limits the rolling movements acting on at least one of the ball and socket joints and a single-axle joint at the other end.

12. The large-capacity vehicle as claimed in claim 1, wherein a rotational axis formed by at least one of the ball and socket joints and single-axis joints of the upper articulated joint and a rotational axis of the lower vehicle joint, movable in a spherical fashion and arranged centrally at a vertical distance between the carriages, lie on the same vertical axis.

13. A large-capacity vehicle for transporting people, comprising:

carriages coupled by lower articulated connections and by upper articulated connections, at least two carriages being respectively supported on at least one of a bogie and set of running gear, both the lower articulated connections and the upper articulated connections permitting turning movements of the carriages about the vertical axis when cornering, the vehicle including more than three parts, wherein at least one upper articulated connection is embodied in such a way that the vehicle can carry out pitching movements about a transverse axis when traveling through a depression or over an elevation, one of the upper articulated connections including a connecting element embodied and connected to the at least two carriages configured to permit pivoting and rolling movements about a longitudinal axis of the vehicle, wherein [the connecting element of the upper articulated connection is embodied as a rigid connector rod and is connected to the two carriages via ball and socket joints and] the connecting element of the upper articulated connection is embodied as a twistable connector rod and is connected to the two carriages via single-axle joints.

14. The large-capacity vehicle as claimed in claim 13, wherein a rotational axis formed by at least one of [the] ball and socket joints and the single-axle joints of the upper articulated joint and a rotational axis of the lower vehicle joint, movable in a spherical fashion and arranged centrally at a vertical distance between the carriages, lie on the same vertical axis.

15. The large-capacity vehicle as claimed in claim 13, wherein the rolling movements are limited by a component including a damping function.

16. A large-capacity vehicle for transporting people, comprising:

a plurality of carriages coupled to one another by lower articulated connections and by upper articulated connections, the lower articulated connections and the upper articulated connections being configured to permit turning movements of the plurality of carriages about a vertical axis, wherein at least one upper articulated connection is configured to permit the vehicle to carry out pitching movements about a transverse axis, and is configured to permit pivoting and rolling movements about a longitudinal axis of the vehicle, wherein a connecting element of the upper articulated connection is embodied as a rigid connector rod and is connected to the two carriages via ball and socket joints.

17. A large-capacity vehicle for transporting people, comprising:

a plurality of carriages coupled to one another by lower articulated connections and by upper articulated connections, the lower articulated connections and the upper articulated connections being configured to permit turning movements of the plurality of carriages about a vertical axis, wherein at least one upper articulated connection is configured to permit the vehicle to carry out pitching movements about a transverse axis, and is configured to permit pivoting and rolling movements about a longitudinal axis of the vehicle and a connecting element of the upper articulated connection is embodied as a twistable connector rod and is connected to the two carriages via single-axle joints.

* * * * *

UNITED STATES PATENT AND TRADEMARK OFFICE

CERTIFICATE OF CORRECTION

PATENT NO. : RE44,517 E
APPLICATION NO. : 13/067731
DATED : October 8, 2013
INVENTOR(S) : Volker Albert et al.

It is certified that error appears in the above-identified patent and that said Letters Patent is hereby corrected as shown below:

On the title page, item (75) Inventors should read:

Volker Albert, Krefeld (DE);
Paul Bernard, Duesseldorf (DE);
Dirk Schillings, Crostau (DE)

Signed and Sealed this
Twenty-fourth Day of December, 2013

Margaret A. Focarino

Margaret A. Focarino
*Commissioner for Patents of the United States Patent and Trademark Office*